3,520,884
RECOVERY OF CEPHALOSPORIN $C_A$ COMPOUND USING COMPLEX WITH A THIOCYANATE SALT

Christopher J. Sharp, Northolt, and Harold A. Crisp, Harrow Weald, England, assignors to Glaxo Laboratories Limited Greenford, Middlesex, England, a British company
No Drawing. Filed July 31, 1967, Ser. No. 657,008
Claims priority, application Great Britain, Aug. 10, 1966, 35,857/66
Int. Cl. C07d 99/24
U.S. Cl. 260—243          14 Claims

ABSTRACT OF THE DISCLOSURE

A process for the recovery of an N-(7-acylamidoceph-3-em-3-ylmethyl) pyridinium-4-carboxylate wherein its solution in an aqueous medium containing thiocyanate ions is contacted with a water-soluble salt of a metal of group I–B, II–B, III–B, V–A or VIII of the Periodic Table (long form) to form a moderately-or sparingly-soluble complex with the thiocyanate of the metal and recovering the complex from the aqueous medium. In addition to their function in the process, the complexes, themselves, have antibiotic activity.

---

This invention is concerned with improvements in or relating to antibiotics of the cephalosporin $C_A$ type. Cephalosporin $C_A$ compounds can be prepared by the condensation of a 7-acylamidocephalosporanic acid with pyridine or like tertiary organic base in a polar medium e.g. water. A cephalosporin $C_A$ compound of great importance as a broad-spectrum antibiotic is cephaloridine, viz N-(7,2′-thienylacetamidoceph-3-em-3-ylmethyl) pyridinium-4-carboxylate, which forms the subject of British patent specification No. 1,028,563. Cephalosporin $C_A$ compounds, including cephaloridine, are difficult to produce in high yield and/or purity by simple condensation of the 7-acylamidocephalosporanic acid with pyridine in an aqueous medium.

Belgian Pat. No. 652,148 describes, in Example 10, a process for the production of cephaloridine involving the condensation of 7-2′-thienylacetamidocephalosporanic acid with pyridine in an aqueous medium containing potassium thiocyanate. The cephaloridine is recovered from the reaction mixture by treatment with a liquid anion exchanger in the acetate form. This process and variations on it as described in Belgian Pat. No. 675,299 may lead to an enhanced yield of the cephalosporin $C_A$ compound, but the purity of the latter leaves much to be desired.

In this process the cephalosporin $C_A$ antibiotic may be recovered from the reaction mixture by acidification to produce the sparingly soluble hydrothiocyanic acid addition salt thereof followed by regeneration of the free $C_A$ compound. Alternatively the reaction mixture may be treated with ion-exchange media to remove impurities and the $C_A$ compound thereafter recovered by freeze-drying and/or crystallisation.

We have now found that cephalosporin $C_A$ compounds may be recovered from aqueous media in which they are present in solution with thiocyanate ions by adding water-soluble metal salts to such media, thereby forming moderately- or sparingly-soluble complexes of the $C_A$ compound with the thiocyanate of the added metal. These complexes are novel compounds.

According to the invention, therefore, there is provided a process for the preparation of a moderately- or sparingly-soluble complex of a N-(7-acylamidoceph-3-em-3-ylmethyl) pyridinium-4-carboxylate (hereinafter referred to as "the $C_A$ compound") which comprises contacting a water-soluble salt of a metal, preferably a metal which forms a water-soluble thiocyanate salt with an aqueous medium containing the $C_A$ compound in association with thiocyanate ions, and recovering a moderately- or sparingly-soluble complex of the $C_A$ compound with the metal thiocyanate therefrom.

The invention further provides a complex of an N-(7-acylamidoceph-3-em-3-ylmethyl) pyridinium - 4 - carboxylate with a metal thiocyanate, said complex being moderately- or sparingly-soluble in water.

The acyl group on the 7-amino group of the desired product and the pyridinium substituent on the 3-methyl group may be any of those described in Belgian pat. specification No. 655,273. However, the invention, although not limited thereto, is described with particular reference to the production of cephaloridine.

Thus the acyl group may be any of those having the general formulae:

(i) $R'(CH_2)_nCO$— where $R'$ is aryl, cycloalkyl, substituted aryl, substituted cycloalkyl or heterocyclic group and $n$ is an integer from 1–8, preferably 1–4. The heterocyclic ring is preferably a 5- or 6-membered ring containing one or more of O, S and N or such a ring fused to benzene. Examples of these groups include phenylacetyl, nitrophenylacetyl, phenylpropionyl, cyclohexanylacetyl and thienylacetyl.

(ii) $C_nH_{2n+1}CO$— where $n$ is 0 or an integer from 1–7. The alkyl group may be straight or branched and, if desired, may be interrupted by an oxygen or a sulphur atom. Examples of such groups include formyl, acetyl, hexanoyl, heptanoyl, octanoyl and butylthioacetyl.

(iii) $C_nH_{2n-1}CO$— where $n$ is an integer from 2–7. The alkenyl group may be straight or branched and, if desired, may be interrupted by an oxygen or a sulphur atom. Examples of such groups include acrylyl and allylthioacetyl.

(iv) $R'OCR''R'''·CO$— where $R'$ has the meaning defined under (i) or is an alkyl group and $R''$ and $R'''$ are the same or are different and each is a hydrogen atom or an alkyl group. An example of such a group is phenoxyacetyl.

(v) $R'SCR''R'''·CO$— where $R'$, $R''$ and $R'''$ are as defined under (iv). Examples of such thio groups include S-phenylthioacetyl, S-chlorophenylthioacetyl and S-bromophenylthioacetyl.

(vi) $R'(CH_2)_mS(CH_2)_nCR''R'''·CO$— where $R'$, $R''$ and $R'''$ are as defined under (iv), $m$ is an integer from 1–4 and $n$ is 0 or an integer from 1–4. Examples of such a group include S-benzylthioacetyl, benzylthiopropionyl and β-phenethylthioacetyl.

(vii) $R'CO$— where $R'$ has the meaning defined under (i). Examples of such groups include benzoyl, substituted benzoyl and cyclopentanoyl. Where the benzoyl group is substituted and substituents may be alkyl or alkoxy and the substituents may be in the 2- or 2- and 6-positions.

Metal salts which may be used include salts of metals selected from groups I–B, II–B, III–B, V–A and VIII of the Periodic Table (long form). Although one may employ salts which give rise to moderately soluble complexes, e.g. salts of $Al^{3+}$, $Fe^{3+}$, $Co^{2+}$, $Fe^{2+}$ or $Ni^{2+}$, we prefer to employ salts which give rise to sparingly-soluble complexes, e.g. salts of $Zn^{2+}$, $Cd^{2+}$, $Ag^{+}$, or $Cu^{2+}$, because the use of such salts enhances recovery. Of the latter group we particularly prefer to use salts of $Zn^{2+}$ or $Cd^{2+}$ because these metals form water-soluble thiocyanates. By using such salts the recovered zinc or cadmium thiocyanate complex is relatively uncontaminated with zinc or cadmium thiocyanate salt whereas $Ag^{+}$ and $Cu^{2+}$ form water-insoluble thiocyanates which would contaminate the corresponding complexes. The metal salt is conveniently added to the aqueous medium containing the $C_A$ compound and thiocyanate ions as an aqueous solution although, if desired, it may be added in solid form.

The process according to the invention is of especial importance in recovering $C_A$ compounds from mother liquors which might otherwise be discarded. Thus, for example, in the manufacture of $C_A$ compounds from 7-acylamido-cephalosporanic acids in the presence of a molar excess of thiocyanate ions, it is convenient to recover the $C_A$ compound by dilution of the reaction medium followed by acidification to form the insoluble hydrothiocyanic acid addition salt from which the $C_A$ compound may be regenerated. The residual mother liquor however still contains a significant proportion of the $C_A$ compound in association with thiocyanate ions. We have found that these mother liquors may be treated by the process according to the invention to yield the desired complex, albeit in impure form.

However, the complex thus obtained may be converted to relatively pure $C_A$ compound by the method described below.

The complexes obtained according to the invention exist in crystalline form. Thus pure zinc thiocyanate-cephaloridine complex may be obtained by mixing an aqueous solution of cephaloridine with an aqueous solution containing $Zn^{2+}$ and $SCN^-$ ions. After recrystallisation from a mixture of acetone and water a white crystalline solid is obtained which analyses as $Zn(cephaloridine)_2(SCN)_2$. Ultraviolet and infrared spectra are in agreement with this structure. This compound has a solubility of ca. 0.4% in water at 4° C. but in a 5% solution of sodium thiocyanate its solubility is reduced to 0.07% and in a 5% solution of zinc thiocyanate to less than 0.01%. These properties enable one to recover the cephaloridine complex from cephaloridine/thiocyanate solutions in high yield.

The $C_A$ compounds may be regenerated from the relatively pure complexes by dissolution in a basic organic solvent e.g., pyridine, N,N-dimethylacetamide or N,N-dimethylformamide, followed by acidification with an acid having a pKa in water of less than 4 to precipitate a product comprising an acid addition salt of the $C_A$ compound. The acid addition salt may be any of those described in Belgian patent specification No. 655,273, but is preferably the hydronitrate. The product may be converted to the parent $C_A$ compound as described in said specification.

However, where the complex is impure, the $C_A$ compound is preferably recovered by first reacting the metal complex with a base, contaminants being separated in an organic phase and the betaine being recovered in an aqueous phase as in Step (B) of patent application No. 627,933 and thereafter proceeding as in Steps (C), (D) and (E) of said application. The invention therefore provides as an embodiment thereof a process which includes the following steps, and which includes in particular steps (B) to (E) as applied to a crude, pre-formed complex:

(A) Reacting a 7-acylamidocephalosporanic acid or a salt thereof with a pyridine in an aqueous medium in the presence of an at least equimolar proportion, calculated on the 7-acylamidocephalosporanic acid, of thiocyanate ions; recovering the resultant $C_A$ compound as its crude hydrothiocyanate; and reacting the mother liquors with a water-soluble metal salt as described above to form a moderately- or sparingly-soluble complex of the $C_A$ compound with a metal thiocyanate;

(B) Converting the crude complex from (A) to the betaine form by reacting said complex with a base, thiocyanate impurities being separated in an organic phase, the resulting betaine being recovered in an aqueous phase and any solid impurities being rejected;

(C) If desired, passing the aqueous phase from (B) through one or more ion-exchangers and, if desired, decolourising absorbents to remove further impurities e.g. acidic and basic impurities as well as colourants;

(D) Reacting the aqueous phase from (B) or (C) with an acid, particularly nitric acid, to form an insoluble acid addition salt of the betaine; and (E) Separating the acid addition salt from (D) from the mother liquor and converting the salt to the betaine form by reaction with a base.

STEP (A)

The preparation and recovery of the hydrothiocyanic acid addition salt is preferably effected as described in patent application No. 627,933 and the mother liquors remaining are thereafter treated with a metal salt as described above to precipitate a complex. The complex is preferably separated from the remaining mother liquid with the help of a filter aid.

STEP B

The conversion of the complex from (A) to the betaine is conveniently effected by means of a two-phase system, an aqueous phase for the recovery of the betaine and a water-immiscible organic phase containing an ion-exchanger for the removal of thiocyanate, and any other anions which may be present. This may conveniently be effected by contacting the complex recovered from (A) with water and a water-immiscible basic ion-exchanger, preferably in a water-miscible solvent. The resultant mixture is then agitated, and the ion-exchanger is extracted into a water-immiscible organic solvent, the phases are separated and the aqueous betaine-containing phase is, if necessary, further extracted with a water-immiscible organic phase containing basic ion-exchanger to remove further thiocyanate ions, and also, if desired, further extracted with a water-immiscible organic solvent. A suitable basic ion-exchanger for this step is "Amberlite" LA–1 or "Amberlite" LA–2. These are weakly basic high molecular weight secondary amines and are almost insoluble in water. In the free base form they are liquid. Suitable organic solvents include halogenated aliphatic hydrocarbons, e.g. carbon tetrachloride, methylene chloride, dichloroethane or chloroform.

The betaine so obtained is impure and contains as impurities inorganic ions and traces of the corresponding 7-acylamidocephalosporanic acid and the corresponding $\Delta^2$-compound and other minor impurities.

Steps (C), (D) and (E) are thereafter effected as described in patent application No. 627,933. As in that application we prefer to form the hydronitrate acid addition salt in Step (D).

The complexes according to the invention have also been found to have antibiotic activity. The invention therefore further provides pharmaceutical compositions for human and veterinary use comprising, as active ingredient, at least one complex according to the invention together with a pharmaceutical carrier or excipient. The complex is preferably Zn (Cephaloridine)$_2$(SCN)$_2$. The composition is preferably adapted for topical administration, and conveniently also comprises an anti-inflammatory steroid, e.g., betamethasone or a 17-ester thereof, especially the 17-valerate.

The complex and active steroid may be formulated into a preparation suitable for topical administration in conventional manner with the aid of one or more carriers or excipients. Examples of type of preparation include ointments, lotions, creams, powders, drops (e.g. ear drops and eye drops), and aerosols. Ointments and creams may for example be formulated with an aqueous or oily base with the addition of suitable thickening and/or gelling agents. Such bases may thus, for example, include water, a mineral oil such as liquid paraffin, a vegetable oil such as arachis oil, an oily ester such as isopropyl myristate, or a water-miscible base such as propylene glycol or isopropyl alcohol. Thickening agents which may be used according to the nature of the base include soft paraffin, aluminium stearate, cetostearyl alcohol, polyethylene glycols, carboxypolymethylene, cellulose derivatives, etc.

Lotions may be formulated with an aqueous or oily base and will in general also include one or more of the following, namely, emulsifying agents, dispersing agents, suspending agents, thickening agents, colouring agents, perfumes and the like.

Powders may be formed with the aid of any suitable powder base e.g. talc, zinc oxide, starch etc. Drops may be formulated with an aqueous base also comprising one or more dispersing agents, suspending agents, solubilising agents etc.

The pharmaceutical compositions according to the invention may also include one or more preservatives or further bacteriostatic agents e.g. $\beta$-phenylethyl alcohol, chlorbutol, chlorhexidine and sorbic acid.

In order that the invention may be well understood the following examples are given by way of illustration only. The words Clarcel-Flo, Amberlite, Zeo-Karb, Deacidite and Nujol used herein are registered trademarks.

Example 1

Sodium 7-(2'-thienylacetamido)-cephalosporanate (100 g.) was reacted with pyridine (34.7 ml.) and potassium thiocyanate (450 g.) in water (100 ml.) for 5 hours at 60° and worked up as in Example 1 of patent application No. 627,933 to yield N-(7-2'-thienylacetamidoceph-3-em-3-ylmethyl)-pyridinium - 4 - carboxylate hydronitrate in 60.8% of theory.

The liquors from the filtration of the crude hydrothiocyanate salt were treated with hydrated zinc acetate (10 g.) in water (50 ml.) at 0° in the presence of "Clarcel-Flo" filter aid (5 g.). The mixture was filtered and sucked as dry as possible on the pump.

The filter cake was stirred with liquid anion exchanger (Amberlite LA 2, 10 ml.), acetone (60 ml.) and water (30 ml.) at 30° for 10 mins. The mixture was diluted with water (60 ml.) and carbon tetrachloride (20 ml.) and filtered. The residual filter cake was washed twice with water (30 ml.) and the second wash was kept separate for subsequent backwashes. The main filtrate was separated and the aqueous layer washed twice with LA 2 (1 ml.) in carbon tetrachloride (10 ml.) and once with carbon tetrachloride (10 ml.). All organic layers were backwashed with the final filter wash.

The combined aqueous solutions were stirred under reduced pressure in the presence of alumina (5 g.) at 30°, treated with pyridine (1.5 ml.) and passed through a column of alumina (10 g.), Zeo-Karb 225 (pyridine form, 10 ml.), and Deacidite FF (acetate form, 10 ml.), all prepared in 1% pyridine. The column was eluted with 1% pyridine and the eluate treated with 4 N nitric acid (25 ml.).

The N-(7-2' - thienylacetamidoceph-3-em-3-ylmethyl)-pyridinium-4-carboxylate hydronitrate crystallised at 0° and was collected by filtration, washed with acetone and dried at 40° in vacuo to yield 3.3 g. (2.9%) of a white crystalline product $[\alpha]_D +44.6°$ (c., 1.0 in pH 7 buffer), $\lambda_{max}$. 238 m$\mu$;

$E_{1\,cm.}^{1\%}$ 349, $\lambda$ infl. 255 m$\mu$: $E_{1\,cm.}^{1\%}$ 314

Electrophoresis in pH 2.2 buffer showed a trace of the $\Delta^2$-isomer running slightly faster than the cephaloridine main spot.

Example 2

Sodium 7-(2'-thienylacetamido)-cephalosporanate (20 g.), potassium thiocyanate (90 g.), pyridine (7 ml.) and water (20 ml.) were stirred together at 60° for 5 hours. The reaction mixture was then diluted with water (500 ml.) and the solution was cooled to 0°. A solution of hydrated zinc acetate (20 g.) in water (100 ml.) was added to the stirred cold solution and after thirty minutes the precipitate was collected by filtration, washed by displacement with ice-cold water (100 ml.) and sucked as dry as possible on the filter. The damp filter cake, acetone (150 ml.), water (200 ml.), Deacidite FF resin (acetate form; 60 ml.) and Zeo-Karb 225 resin (pyridine form; 40 ml.) were stirred together at 45° for 45 minutes. The stirring was stopped and the supernatant liquors were decanted. The resins were extracted twice more with aqueous acetone (175 ml. each extract). The aqueous acetone extracts were combined and the acetone was evaporated off under reduced pressure. Pyridine (4.5 ml.) was added to the aqueous solution which was then passed through a column of acid alumina (10 g.) Zeo-Karb 225 (pyridine form; 20 ml.) and Deacidite FF (acetate form; 35 ml.) and the column was eluted with 1% pyridine in water. To the eluate (650 ml.) containing the pyridine derivative, 4 N nitric acid (60 ml.) was added and the suspension was cooled to 0°. The precipitate was collected by filtration, washed with acetone and dried in vacuo at 40° to give white, crystalline N-(7-2' - thienylacetamidoceph-3-em-ylmethyl)-pyridinium - 4 - carboxylate hydronitrate (10.9 g.; 47.7% of theory) with $[\alpha]_D +40°$ (c. 1. in 0.2 M pH 7 buffer) and $\lambda_{max}$. 238 m$\mu$, $E_{1\,cm.}^{1\%}$ 350, $\lambda$ infl.

255 m$\mu$. $E_{1\,cm.}^{1\%}$ 314

Examples 3–7 show the preparation of substantially pure cephaloridine-metal thiocyanate complexes.

Example 3.—Zn(cephaloridine)$_2$(SCN)$_2$

Zinc acetate dihydrate (10 meq., 1.10 g) and ammonium thiocyanate (10 meq., 0.761 g.) were dissolved in water (10 ml.) and this solution added dropwise with stirring to 40 ml. of an aqueous solution containing excess cephaloridine (22 meq., 5 g.). The product immediately precipitated, was filtered off, washed with ice-cold water (2×10 ml.), and sucked as dry as possible on the filter. The mother liquors and washings were combined and cooled to 4° C. for 3 hours to yield a second crop of material. Both crops were dried at 40° C. over P$_2$O$_5$ in vacuo for 16 hours. The yield of complex was as follows:

1st crop: 4.17 g. (82.5% of theory)
2nd crop: 0.18 g. (overall 86.0% of theory)

A sample was recrystallised from aqueous acetone for analysis.

Example 4

Cd(cephaloridine)$_2$(SCN)$_2$ was prepared in the manner described in Example 3.

Example 5

Co(cephaloridine)(SCN$_2$·2H$_2$O was prepared in the manner described in Example 3.

Example 6

Fe(cephaloridine)$_2$(SCN)$_3$·2H$_2$O was prepared in the manner described in Example 3.

Example 7

V(cephaloridine)(SCN)$_2$.2H$_2$O was prepared in the manner described in Example 3.

The analyses and properties of compounds of Examples 3–7 are shown in the following tables.

| | U.V. assay, for cephaloridine, percent | Elemental assay, percent | | | | $[\alpha]_D$, in dimethylacetamide | Colour | Characteristic I.R. Absorption Bands cm.$^{-1}$, as Nujol mull |
|---|---|---|---|---|---|---|---|---|
| | | C | H | N | Metal | | | |
| Example 3: | | | | | | | | |
| Found | 81.5 | 47.15 | 3.65 | 10.85 | 6.65 | minus 25.5° | White | 1,540, 1,615, 1,680, 1,690, 1,790, 2,060, 2,100 |
| Reqd | 82.0 | 47.5 | 3.35 | 11.1 | 6.45 | | | |
| Example 4: | | | | | | | | |
| Found | 73.0 | 45.0 | 3.4 | 10.5 | 10.35 | minus 16.5° | do | 1,540, 1,595, 1,690, 1,802, 2,080, 2,100, 2,120 |
| Reqd | 78.5 | 45.5 | 3.2 | 10.6 | 10.6 | | | |
| Example 5: | | | | | | | | |
| Found | 64 | 40.35 | 3.5 | 11.0 | 9.7 | Too coloured | Blue | 1,530, 1,615, 1,680, 1,690, 1,790, 2,095 |
| Reqd | 66.5 | 40.75 | 3.4 | 11.15 | 8.9 | | | |
| Example 6: | | | | | | | | |
| Found | 77.6 | 44.5 | 3.6 | 11.4 | 4.9 | do | Red | 1,530, 1,630, 1,670, 1,790, 2,060 |
| Reqd | 78.1 | 44.5 | 3.4 | 11.5 | 5.1 | | | |
| Example 7: | | | | | | | | |
| Found | 64.0 | 41.05 | 3.55 | 11.0 | 8.25 | do | Grey-green | 1,530, 1,640, 1,690, 1,790, 2,100 |
| Reqd | 67.2 | 40.8 | 3.4 | 11.3 | 8.25 | | | |

Example 8

N - (7-2'-thienylacetamidoceph - 3 - em-3-ylmethyl)-4''-carbamoylpyridinium-4-carboxylate (1 g.) was dissolved by warming in 5 ml. of a 5% aqueous solution of zinc nitrate. The solution was filtered, and poured into a solution of ammonium thiocyanate (2 g.) in water (50 ml.). A pale cream solid immediately formed. The solution was cooled to 4° C. for two hours to complete precipitation. The solid was then filtered off, washed with water and sucked as dry as possible. It was finally dried in vacuo at room temperature over phosphorous pentoxide. Yield: 1.036 g. (87% theory).

A sample was recrystallised in about 50% yield from aqueous acetone without change in melting point (172–174° C.) or infrared spectrum. It was dried as above and analysed. (Found (percent) C, 44.4; H, 3.5; N, 12.6; S, 17.7; Zn, 6.2. Zn $(C_{20}H_{18}N_4O_5S_2)_2$ $(SCN)_2$ requires (percent): C, 46.0; H, 3.3; N, 12.8; S, 17.5; Sn, 6.0.)

The complex of Example 3 has been found to show in in vitro tests antibiotic activity comparable with that of cephaloridine itself; comparative biological results for this complex and for cephaloridine are shown in the following table:

| Organism | Minimum inhibitory conc. in μg/ml. of— | |
|---|---|---|
| | Zn(Cephaloridine)$_2$(SCN)$_2$ | Cephaloridine |
| Staph. aureus A | 0.04 | 0.02 |
| Staph. aureus B | 0.3 | 0.62 |
| Staph. aureus C | <0.5 | <0.5 |
| Staph. aureus D | <0.5 | 0.16 |
| Strep. faecalis | 16 | >100 |
| E. coli | <4 | 8 |
| Pr. mirabilis | 32 | 8 |

Staph. aureus strains B, C and D are penicillin resistant, while strain A is penicillin sensitive.

Example 9

Tulle-grass dressing: Parts by weight
(1) Betamethasone 17-valerate _____ 0.1
(2) Zn (Cephaloridine)$_2$ (SCN)$_2$ _____ 10.0
(3) Light liquid paraffin B.P. _____ 20.0
(4) Cremba¹ absorption base ____ To produce 100

¹ Cremba is a mixture of wool alcohol and esters with soft and liquid paraffins, supplied by Croda Products Ltd. of Haymarket, London, SW. 1.

The light liquid paraffin and Cremba base are sterilised by dry heat at 150° C. for one hour. When cool, the paraffin is used to triturate (1) and (2) to form a smooth cream which is ball-milled overnight to produce a dispersion of very fine particle size. The dispersion is then diluted with (4) and after mixing, distributed by weight control on to prepared gauze squares in sterile flat tins, and thereafter sealed to exclude bacteria.

We claim:
1. A process for the recovery of an N-(7-acylamidoceph-3-em-3-ylmethyl) pyridinium - 4 - carboxylate from a solution thereof in an aqueous medium containing thiocyanate ions, comprising contacting said solution with a water-soluble salt of a metal selected from the group consisting of a metal of groups I–B, II–B, III–B, V–A, and VIII of the Periodic Table to produce a moderately- or sparingly-soluble complex of said N-(7-acylamidoceph-3-em-3-ylmethyl) pyridinium - 4 - carboxylate with the thiocyanate of said metal; recovering said complex from said aqueous medium; and converting said complex to said N-(7-acylamidoceph-3-em - 3 - ylmethyl) pyridinium - 4 - carboxylate, the acyl radical being a member selected from the group consisting of $R'(CH_2)_nCO-$ in which $R'$ is a member selected from the group consisting of phenyl, nitrophenyl, cyclohexyl and thienyl and $n$ is 0 or an integer from 1–8; $C_nH_{2n+1}CO-$ in which $n$ is 0 or an integer from 1–7; butylthioacetyl; $C_nH_{2n-1}CO-$ in which $n$ is an integer from 2–7; allylthioacetyl; $R'OCH_2CO-$ in which $R'$ has the meaning given above; $R''SCH_2CO-$ in which $R''$ is a member selected from the group consisting of $R'$ as defined above, chlorophenyl and bromophenyl; and $R'(CH_2)_mS(CH_2)_nCH_2CO-$ in which $R'$ has the meaning given above, $m$ is an integer from 1–4 and $n$ is 0 or an integer from 1–4.

2. A process as defined in claim 1 in which said N-(7-acylamidoceph-3-em-3-ylmethyl)pyridinium - 4 - carboxylate is cephaloridine.

3. A process as defined in claim 2 in which said water-soluble salt is a salt of $Zn^{2+}$ and $Cd^{2+}$.

4. A complex of cephaloridine with a metal thiocyanate in which the metal is selected from the group consisting of a metal of group I–B, II–B, III–B, V–A and VIII of the Periodic Table.

5. A complex as defined in claim 4 having the analysis Zn (cephaloridine)$_2$(SCN)$_2$.

6. A process as defined in claim 1 in which the recovered complex of the N-(7-acylamidoceph-3-em-3-ylmethyl) pridinium-4-carboxylate with thiocyanate of the metal is relative pure and conversion to the N-(7-acylamidoceph-3-em-3-ylmethyl) pyridinium-4-carboxylate includes the steps of dissolving said complex in a basic organic solvent, and acidifying with an acid having a pKa in water less than 4 so that a product comprising an acid addition salt of the N-(7-acylamidoceph-3-em-3-ylmethyl) pyridinium-4-carboxylate precipitates.

7. A process as defined in claim 6 in which the acid is nitric acid and the acid addition salt is the hydronitrate.

8. A process as defined in claim 7 in which the basic organic solvent is dimethylformamide, dimethylactamide, or pyridine.

9. A process as defined in claim 8 in which said N-(7-acylamidoceph-3-em - 3 - lymethyl) pyridinium - 4 - carboxylate is cephaloridine.

10. A process as defined in claim 1 in which the recovered complex of the N-(7-acylamidoceph-3-em-3-ylmethyl) pyridinium-4-carboxylate with the thiocyanate of the metal is relatively impure and conversion to the N-(7-acylamidoceph - 3-em-3-ylmethyl) pyridinium-4-carboxylate includes the steps of
(A) converting the said complex to the betaine form by reacting said complex with a base, thiocyanate impurities being separated in an organic phase, the resulting betaine being recovered in an aqueous phase and any solid impurities being rejected;

(B) if desired, passing the aqueous phase from (A) through at least one ion-exchanger and, if desired, at least one decolourising absorbent to remove further impurities;

(C) reacting the aqueous phase from (A) or (B) with nitric acid to form the insoluble hydronitrate of the betaine; and (D) separating the hydronitrate from (C) from the mother liquor and converting the hydronitrate to the betaine form by reaction with a base.

11. A process as defined in claim 10 in which the complex is converted to the betaine by means of a two-phase system, said two-phase system comprising an aqueous phase for the recovery of the betaine and a water-immiscible orgaic phase containing an ion exchanger for the removal of thiocyanate and any other anions which may be present.

12. A process as defined in claim 11 in which the water-immiscible organic phase comprises a water-immiscible basic ion-exchanger in a water-immiscible solvent.

13. A process as defined in claim 10 in which the solution of a N-(7-acylamidoceph-3-em-3-ylmethyl) pyridinium-4-carboxylate in an aqueous medium containing thiocyanate ions is obtained by reacting a 7-acylamidocephalosporanic acid, or a salt thereof, with a pyridine in an aqueous medium in the presence of an at least equimolar proportion, calculated on the 7-acylamidocephalosporanic acid, of thiocyanate ions; and separating the resultant N-(7-acylamidoceph-3-em-3-ylmethyl) pyridinium-4-carboxylate as its hydrothiocyanate to leave said solution.

14. A process as defined in claim 13 in which said N-(7-acylamidoceph-3-em-3-ylmethyl) pyridinium-4 - carboxylate is cephaloridine.

References Cited

UNITED STATES PATENTS 3,270,012   8/1966   Higgins.

NICHOLAS S. RIZZO, Primary Examiner

U.S. Cl. X.R.

424—245